7126X
W. McCay.
Alcohol Still.
Patented Jun. 22, 1832.
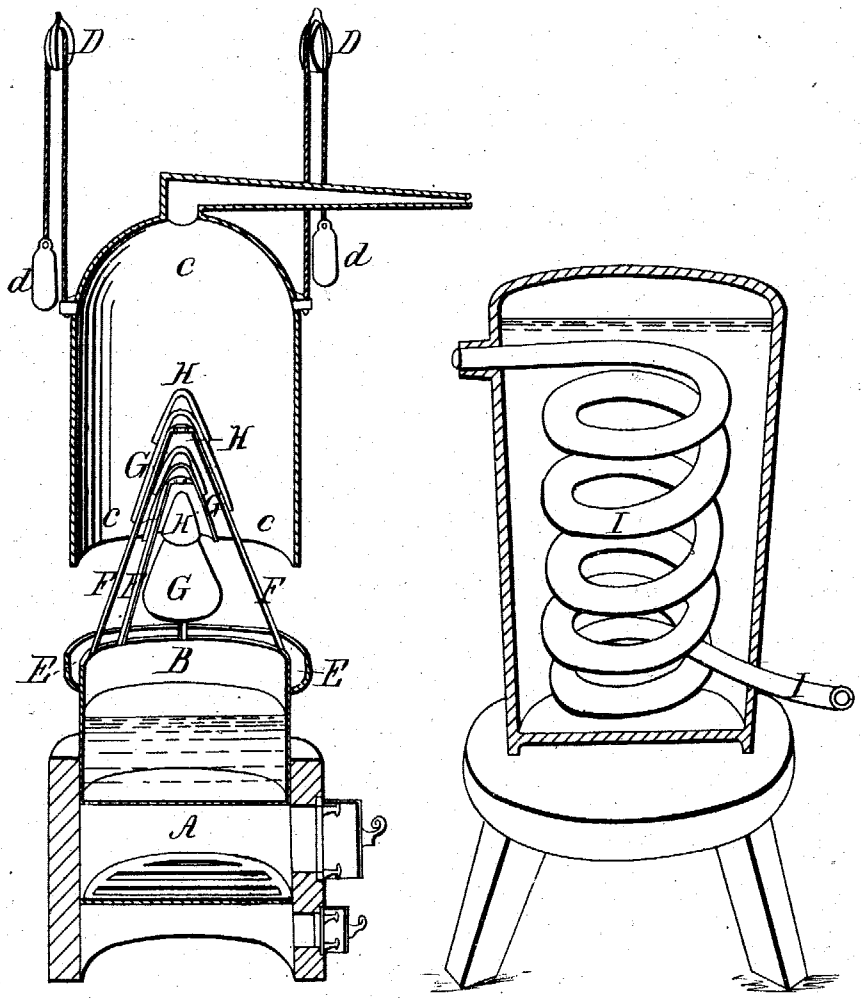
THE ECKERT LITHOGRAPHING CO., WASHINGTON, D. C.

7126x William McCay

Letters Patent

The Schedule referred to in these Letters Patent and making part of the same containing a description in the words of the said William McCay himself of his improvement in the method of extracting the Alcohol used in stiffening Hat bodies & by the process of distillation recovering it again.——

I first erect a furnace in which I place a Boiler open at top: over the boiler I suspend a moveable box open at bottom capable by means of pulleys & weights of being elevated or lowered I then cut around the top of the boiler in order to avoid the necessity of cutting a groove or gutter accommodated to the shape of the box in which filled with water the box is lowered to rest. I then fix one or more supporters or stands of a conical form. springing from opposite sides of the upper edge of the boiler. on each of which I place a hat-body in the stiffening of which Alcohol has been used. Over each hat-body I then place a conical wooden cap & so alternate the bodies & caps that the steam generated in the boiler may pass freely between & around the hat-bodies. Previously however to the placing of the hat-bodies over the aforesaid supporters or stands I immerse the bodies in water. I then lower the box over the hat-bodies and rest it in the groove or gutter filled with water. The box being thus placed over the boiler and the hat-bodies I introduce a worm into it which collecting the vapors: generated by the action of the steam emitted from the boiler upon the Alcohol in the hat-bodies condenses them by passing through a tub of cold water and the alcohol is thus recovered Witnesses
N.L. Bradford
W.B. [illegible]

Wm McCay 326 w[illegible]

Ex: Chff[illegible]

[illegible]